United States Patent [19]
Shepherd

[11] 3,727,067
[45] Apr. 10, 1973

[54] RADIATION RESPONSIVE POSITION DETECTORS

[75] Inventor: Richard Shepherd, Middlesborough, England

[73] Assignee: Decca Limited, London, England

[22] Filed: Aug. 30, 1971

[21] Appl. No.: 176,163

[52] U.S. Cl......250/219 LG, 250/219 WD, 250/236, 356/158, 356/167
[51] Int. Cl.......G01b 11/28, G01n 21/30, H01j 3/14
[58] Field of Search ......................250/219 LG, 236, 250/219 WD; 356/167, 158

[56] References Cited

UNITED STATES PATENTS

| | | | |
|---|---|---|---|
| 3,470,383 | 9/1969 | Persson et al. | 250/219 WD |
| 3,033,991 | 5/1962 | Sampson | 250/219 WD |
| 3,364,358 | 1/1968 | Ashworth | 250/219 LG |

FOREIGN PATENTS OR APPLICATIONS

| | | | |
|---|---|---|---|
| 791,813 | 3/1958 | Great Britain | 356/167 |

*Primary Examiner*—James W. Lawrence
*Assistant Examiner*—T. N. Grigsby
*Attorney*—John A. Mawhinney

[57] ABSTRACT

A radiation responsive position detector comprising a sealed enclosure having a window, said enclosure containing a motor, a hollow cylinder which is connected to the motor to be driven thereby, said cylinder being rotatable about its principal axis and having axially directed slits spaced around its curved part, a radiation responsive device with a mask that is inside the cylinder and has an elongate aperture parallel to the slits, and means for indicating when the cylinder is in a predetermined angular position, said means including a photocell and a light source, one disposed within the cylinder, the other outside the cylinder to define an optical path which intersects the path of the rotating slits.

4 Claims, 3 Drawing Figures

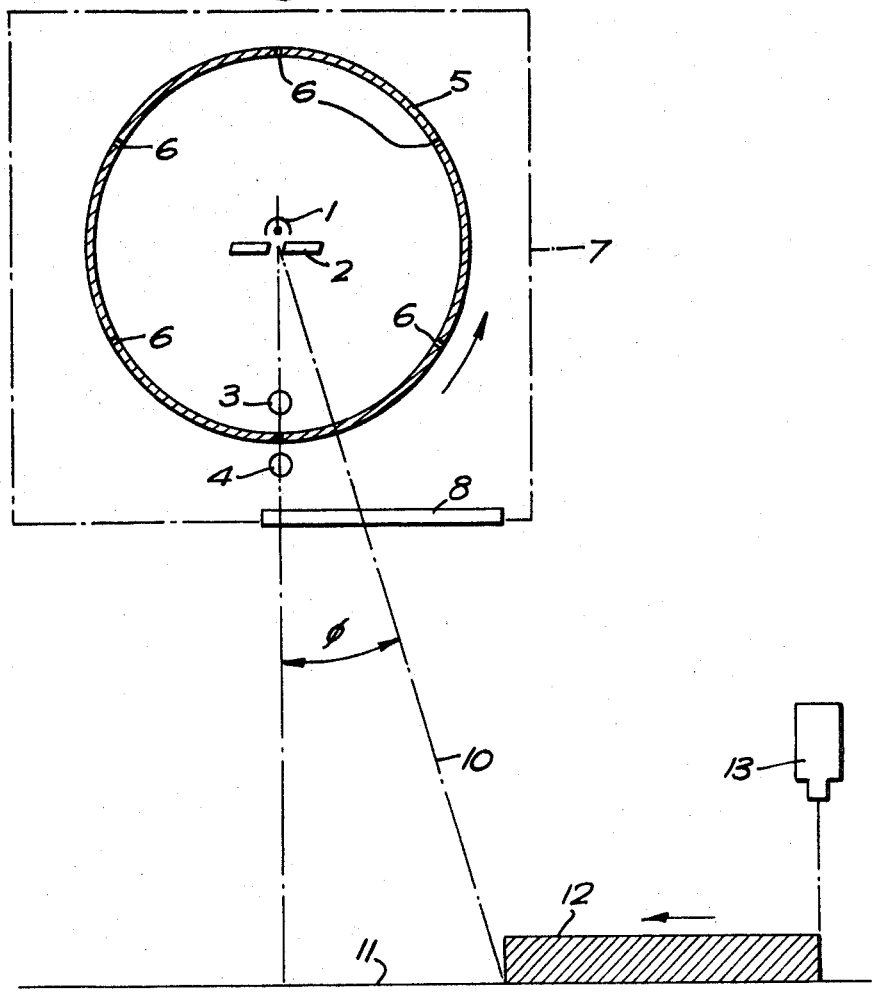

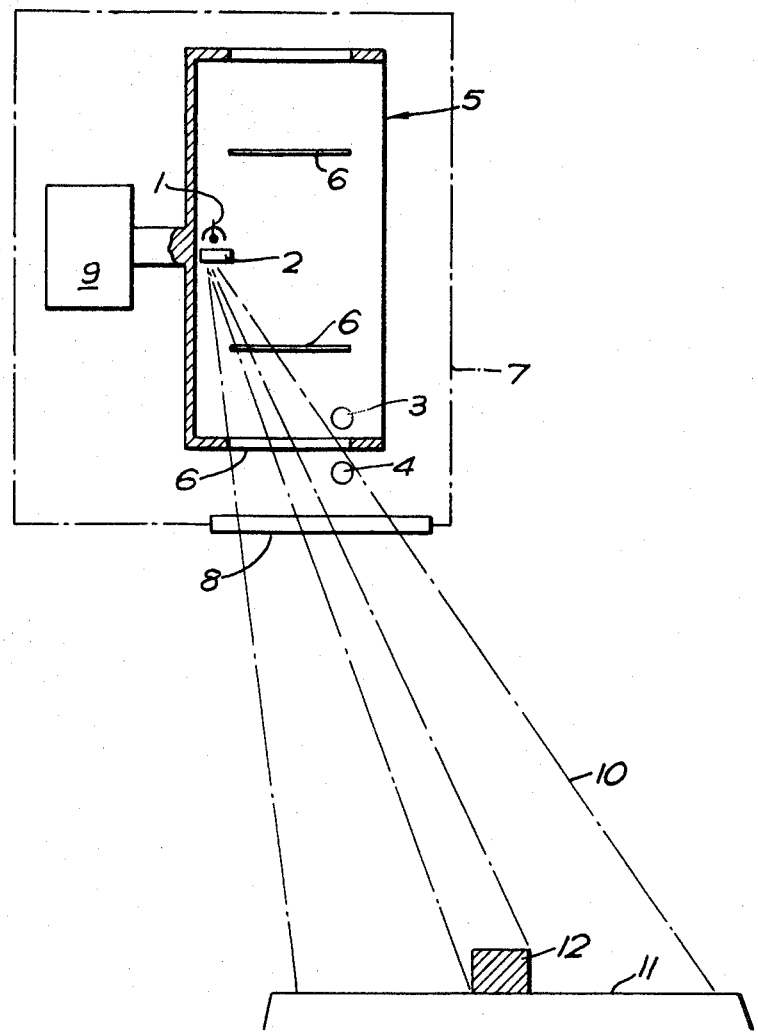

RADIATION RESPONSIVE POSITION DETECTORS

This invention relates to radiation responsive position detectors and according to the invention a radiation responsive position detector comprises a hollow cylinder which is rotatable about its principal axis and has axially directed slits spaced around its curved part, and a radiation responsive device with a mask that is inside the cylinder and has an elongate aperture parallel to the slits.

By 'radiation' is meant, generally, electro-magnetic radiation at optical wave lengths, but other forms of radiation are not excluded.

One particular although by no means exclusive use for the present invention would be in the measurement of lengths of billets from rolling mills and in order to explain the invention in more detail this use will be described. The detector may be mounted above, though for reasons hereinafter explained, not necessarily directly above, the track of billets coming out of the rolling mill. The said axis would be transverse and above the path of the billets. Means would be provided for rotating the cylinder and means would be provided for indicating when the cylinder was in a predetermined angular position. After the end of the billet has passed through a plane extending perpendicularly upwards from the track to the axis of the detector the time between the instant when the cylinder passes through the reference condition and the time when the narrow field of view extending from the detector outwardly through any given slit passes through the end of the billet varies and in fact is simply related to the position of the end of the billet from the said vertical plane. The detector must sense radiation or a change in radiation for this purpose but this can readily be provided by illuminating the billet from behind or by directing light towards the billet and receiving it or by using radiation emitted by the billet itself. Since the detector can be used to determine the position of one end of the billet and by a variety of means such as the interruption of an optical beam the instant at which the leading end of the billet passes through a given point can be determined it is readily possible to use the detector in the measurement of the length of the billet.

Since the track along which the billets pass has considerable width it is not possible to determine in advance whether the billet is going to travel along one side of the track or the other or nearer the middle. It is accordingly necessary to mount a detector with a sufficiently wide angle of view above the center line of the track. Such a location is frequently inconvenient but has been tolerated when using a detector with rotating polygon mirrors because it is not possible to mount a tilted detector at one side of the track without suffering inaccuracies caused by the field of view becoming skew with respect to a line truly transverse to the track. If the detector is mounted at the side of the track, however, it is not necessary to tilt it in order that its wedge of view shall cover the track, instead the fixed aperture may be moved along the cylinder axis so that the whole detector squints across the track. Since the axis of rotation is still horizontal this arrangement does not suffer from the skew errors but maintains a truly rectangular relationship between the field of view on the photo-electric cell, or its equivalent, and the direction of motion of the billet.

The radiation responsive device preferably has a good polar response in order to receive radiation over a substantial angle of view.

A device according to the present invention can conveniently be used in the measurement of thickness and if it is disposed at the focus of a parabolic mirror with the axis of rotation of the cylinder perpendicular to the parabolic plane of the mirror a linear difference between two parallel lines extending to different faces or edges of an object can easily be converted to an angular indication. It is thus possible to measure accurately the depth or width of an object using a single detector.

Moreover, if the detector is to utilize light reflected from an object being measured or detected a light source which may be a laser can be mounted within the mask itself so as to project light outwardly through the mask and the slitted cylinder.

Reference will now be made to the accompanying drawings, in which:

FIG. 2 is a sectional view, from one end, of the detector of FIG. 1; and

FIG. 3 is a sectional view, corresponding to FIG. 1, of another embodiment of the detector.

Figure 1:
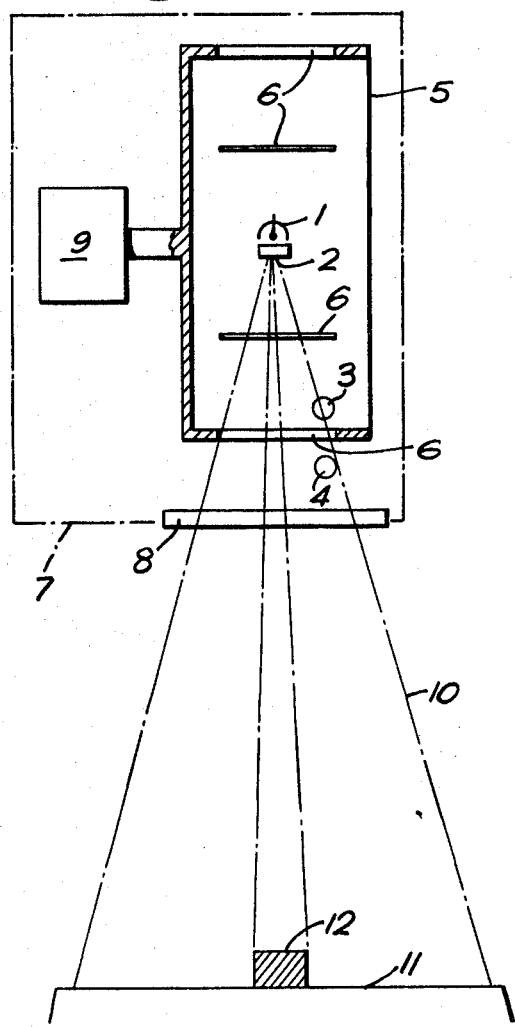
FIG. 1 is a sectional diagrammatic view of one embodiment of a detector according to the invention.

FIGS. 1 and 2 illustrate a detector including a hollow cylinder 5 which is rotatable about its principal axis. Six axially directed slits 6 are evenly spaced around the curved part of the cylinder, and a radiation responsive device 1 (such as a photo-electric cell, or a number of such cells) is provided with a fixed mask having an elongated aperture 2 parallel to the rotating slits 6.

The detector is mounted above, though not necessarily directly above, the path of a billet 12 coming out of a rolling mill on a track 11. The rotational axis of the cylinder is transverse and above the path of the billet. The cylinder 5 is rotated by a motor 9 at a steady speed.

It is normally necessary to generate a reference pulse at the instant when a slit 6 passes a known position. Means for producing this reference pulse are provided by a lamp 3 and a photocell 4 which cooperate to produce an electrical pulse, when a slit 6 passes through the line between them.

It is preferable, although not essential, that this reference pulse be generated at the instant of time at which a slit 6 is passing through a line drawn vertically between the cylinder's rotational axis and the track 11.

If a red hot billet passes along the track beneath the cylinder then its radiation will be received by the photocell 1 only when a slit 6 is lined up with the aperture 2 and the surface of the billet. Since the cylinder 5 is continuously rotating, the photocell 1 will receive a series of pules of radiation exposure corresponding with the times at which the slits permit the photocell 1 to field of view 10 which extends over the surface of the billet. During the time that the alignment of the slits does not permit this view of the surface of the billet the photocell 1 will not receive energy.

The time taken by a rotating slit 6 to rotate between the reference position, as detected by the lamp 3 and cell 4, and the position in which the slit 6 and aperture 2 permit the photocell 1 to view of the end surface of the billet is a measure of the angle $\phi$ through which the cylinder has rotated. This time can be measured by any suitable means.

If the rotational speed of the cylinder is known then the angle φ can be measured in terms of this rotational speed and the said time. If the height of the rotational axis of the cylinder is H then the distance of the end of the billet from a perpendicular line joining the said axis and the track is H tan φ. Thus the detector can be used to determine the position of one end of the billet and since by a variety of means, such as the detection by a detector 13 of the interruption of an optical beam, the instant at which the other end of the billet passes a given point can be determined it is readily possible to use the detector in the measurement of length of a billet.

Although the foregoing description uses the radiation of the billet as a source of energy to be seen by the photocell 1 it is readily possible to provide the energy by illuminating the billet from behind or by directing light towards the billet and detecting the reflection of this light.

In FIGS. 1 and 2 the aperture 2 is centrally disposed relative to the slits. FIG. 3 shows an arrangement in which the fixed aperture 2 is offset axially from the slits 6. This allows the mounting of the detector away from a position immediately above the track 11.

For convenience and protection of the detector it is preferable to enclose the whole device in a sealed enclosure 7 and to provide a suitable window 8 to allow the track to be seen by the photocell 1.

This window 8 may be made from a polarizing material with a suitable transmission characteristic for the wavelength of the radiation in use, in order to minimize reflections from the track.

I claim:

1. A radiation responsive position detector comprising a sealed enclosure having a window, said enclosure containing a motor, a hollow cylinder which is connected to the motor to be driven thereby, said cylinder being rotatable about its principal axis and having axially directed slits spaced around its curved part, a radiation responsive device with a mask that is inside the cylinder and has an elongate aperture parallel to the slits, and means for indicating when the cylinder is in a predetermined angular position, said means including a photocell and a light source, one disposed within the cylinder, the other outside the cylinder to define an optical path which intersects the path of the rotating slits.

2. A detector according to claim 1 in which the aperture is centrally disposed relative to the slits in the cylinder.

3. A detector according to claim 1 in which the aperture is axially offset from the slits.

4. A detector according to claim 1 in which the said window and photocell are in alignment.

* * * * *